United States Patent [19]

Cologna et al.

[11] Patent Number: 5,034,254
[45] Date of Patent: Jul. 23, 1991

[54] BLIND-SIDE PANEL REPAIR PATCH

[75] Inventors: Rudy L. Cologna, Bellevue; Melvin D. Eng, Kent, both of Wash.

[73] Assignee: The Boeing Company, Seattle, Wash.

[21] Appl. No.: 460,773

[22] Filed: Jan. 4, 1990

Related U.S. Application Data

[62] Division of Ser. No. 336,200, Apr. 11, 1989, Pat. No. 4,961,799, which is a division of Ser. No. 665,809, Oct. 29, 1984, Pat. No. 4,820,564.

[51] Int. Cl.$^5$ .......................... B32B 3/10; B32B 35/00
[52] U.S. Cl. .................... 428/63; 29/402.12; 29/402.15; 52/514; 156/92; 156/94; 156/98; 156/307.4; 206/582; 264/36; 428/116
[58] Field of Search ......................... 29/402.12, 402.15; 52/514; 156/92, 94, 98, 307.4; 264/36; 428/63

[56] References Cited

U.S. PATENT DOCUMENTS 4,588,626  5/1986  Cologna et al. .................. 428/63
4,820,564  4/1989  Cologna et al. .................. 428/63

Primary Examiner—James C. Cannon
Attorney, Agent, or Firm—Kenneth J. Cooper

[57] ABSTRACT

A repair patch for damaged sections of panels made of composite materials, wherein the damaged section of the panel has been cut out by, for example, a hole cutting saw, includes a bolt which is inserted through the hole and a rigid washer on the bolt, of about the same diameter as the hole. A flexible washer, substantially larger than the hole, is pushed through the hole and the rigid washer bears against it. The flexible washer has radiating flukes, extending from a central hub region, which can bend when the flexible washer is pushed through the hole, and then spring back to about their original shape on the blind-side. One edge of the flukes is curved which causes the flukes to twist and present only one edge to the edge of the hole as the flexible washer is pushed through, to facilitate passage of the flexible washer through the hole. A set of resin-impregnated fabric plies is pushed through the hole behind the flexible washer on the bolt and is pressed against the marginal regions of the hold on the blind side of the panel by the flexible washer. The hole is packed full of resin-impregnated fill material or a plug cut from a similar panel, and a set of resin-impregnated repair plies is pressed over the fill material and against the near side of the panel around the marginal regions of the hole by a back-up plate on the bolt. The entire assembly is sequeezed tight against the panel by a nut on the bolt and held in place while the resin cures, after which the nut and plate are removed and the bolt is cut off flush with the near side panel surface to produce a flush, smooth patch having load-bearing material over the hole on both sides of the panel.

10 Claims, 4 Drawing Sheets

BLIND-SIDE PANEL REPAIR PATCH

This is a divisional application of U.S. patent application Ser. No. 07/336,200 filed on Apr. 11, 1989, now U.S. Pat. No. 4,961,79 which in turn was a divisional application of U.S. patent application Ser. No. 665,809 filed on Oct. 29, 1984 and issued as U.S. Pat. No. 4,820,564 on Apr. 11, 1989, which in turn is related to U.S. Pat. No. 4,588,626.

BACKGROUND OF THE INVENTION

This invention relates to a patch for repairing both sides of a panel, one side of which is inaccessible, and more particularly to a repair patch for such panels made of composite material.

There are a great many structures made with panels which are accessible only from one side. These include vehicles of all varieties, such as ground and water vehicles, aircraft and even space vehicles, and also include fixed structures such as buildings and storage tanks. When damage occurs to these panels, the damage must be repaired to restore the structural strength of the panel, restore its smoothness and appearance, and in the case of aerodynamic surfaces, reconfigure the surface to its original curvature or configuration, as close as possible to the original mold line. Repairing the accessible or near-side of the panel is seldom difficult but the panel cannot be restored to full strength if the inaccessible or blind-side of the panel is not repaired. Such blind-side repairs are difficult because of the limited access for positioning the patch material and applying pressure while it cures in place. A panel patched only on its near-side is weak on the blind-side because it is unable to transfer loads across the damaged section. When such a panel is subjected to a bending moment, it is subject to failure at loads much lower than the design capacity of the panel.

The problem is particularly troublesome with modern composite materials because of the higher load requirements for these materials and because of the necessity for producing flush repairs without the use of fasteners. Fasteners were permitted in prior art near-side patches but are undesirable for modern composite material patches. To accommodate the fasteners, additional holes must be drilled in the material, which creates additional weakness in the panel. Moreover, it is difficult to produce a patch that is flush with the original mold line of the panel and conforms exactly with its curvature when using a patch secured with fasteners. Finally, such fasteners exert a constant compression force on the repaired composite panel or honeycomb panel to hold the patch in place which could distort the cross section of the panel in the patch location and thereby reduce its load carrying capacity.

The installation of prior art patches in the vicinity of underlying spars and ribs within the member on the blind-side of the panel requires specially designed patches or connecting structure to the struts or ribs which could interfere with underlying mechanisms. On panels which form an aerodynamic surface, especially on high performance aircraft, the non-conformance to the original contour and loss of smoothness could produce a flutter of the control surface which could adversely affect aircraft performance and cause premature fatigue delaminating of the panel structure.

The few prior art patches for composite materials which provide for patch material on the blind-side require a series of steps, each requiring a separate cure time for the bonding agent in each of the steps. This prolongs the repair process and increases the number of steps involved in making the repair, thereby increasing the cost and increasing the down time of the equipment being repaired. In addition, it is an exacting process requiring special skills and care to produce an acceptable patch. Moreover, the prior art blind-side patches require complicated expensive and cumbersome equipment requiring special training of operators and subject to failure in operation which would interrupt the capability of the facility to make those repairs.

Some other unsolved problems with prior art patches have been the inability to effect a permanent hermetic seal against leakage of pressurized fuel, air, water and other fluids and gases through the patch. Also, prior art patches are often thermally or chemically incompatible with the parent structure so that differential rates of thermal expansion cause loss of hermetic integrity of the patch or cause the panel to become distorted. Chemical incompatibility could cause loss of chemical resistance to certain chemicals such as hydraulic fluid which could cause the patch to swell and weaken. In addition, dissimilar metals and carbon/metal combinations can cause a harmful galvanic reaction that would weaken the patch.

SUMMARY OF THE INVENTION

Accordingly, it is an object of this invention to provide a patch for the blind-side of a panel which provides secure load carrying materials on both the blind-side and the near-side of the panel to restore the panel to nearly its full original load carrying capability. It is another object of this invention to provide a patch which is nearly flush with the original near-side surface and conforms to the original curvature of the panel. It is yet a further object of the invention to provide a patch for the blind-side of the panel which is uniformly and securely bonded to the panel and does not contact or interfer with structure behind the panel. It is yet another object of the invention to provide a patch for the blind-side of a panel that is inexpensive and blends smoothly with the panel to be repaired. It is an additional object of the invention to provide a patch for the blind-side of a panel, specifically for composite material, that hermatically seals the panel permanently and is compatible thermally and chemically with the original panel material.

These and other objects of the invention are attained in a blind-side panel repair patch, which is cured in place over a hole cut in the panel that removes the damaged section of the panel. The patch includes an assembly having a tension exerting member such as a bolt, with a head or a washer just slightly smaller than the hole in the panel, and a flexible washer over a stack of fabric plies impregnated with a bonding agent, into the hole in the panel from the near-side. The flexible washer flexes when pushed through the hole and then expands out to about its original diameter to cover the marginal regions around the blind-side of the hole. Pressure is transmitted from the bolt through the washer to the flexible washer to press the stack of impregnated plies against the blind-side of the panel in a broad marginal region around the hole. The hole in the panel is filled with a fill material, such as potting material or a plug from the original or similar panel, and the near-side of the panel is repaired with fabric plies impregnated with a bonding agent and compressed against the near-side of the panel by a backup plate and a nut on the proximal end of the bolt. After the bonding agent on the blind-side and near-side plies has cured, the nut and support plate are removed and the bolt is cut-off flush with the repaired surface of the panel.

BRIEF DESCRIPTION OF THE DRAWINGS

The invention and its many attendant objects and advantages will become better understood by reference to the following detailed description of the preferred embodiment when read in conjunction with the following drawings, wherein.

DESCRIPTION OF THE PREFERRED EMBODIMENT

Figure 1:
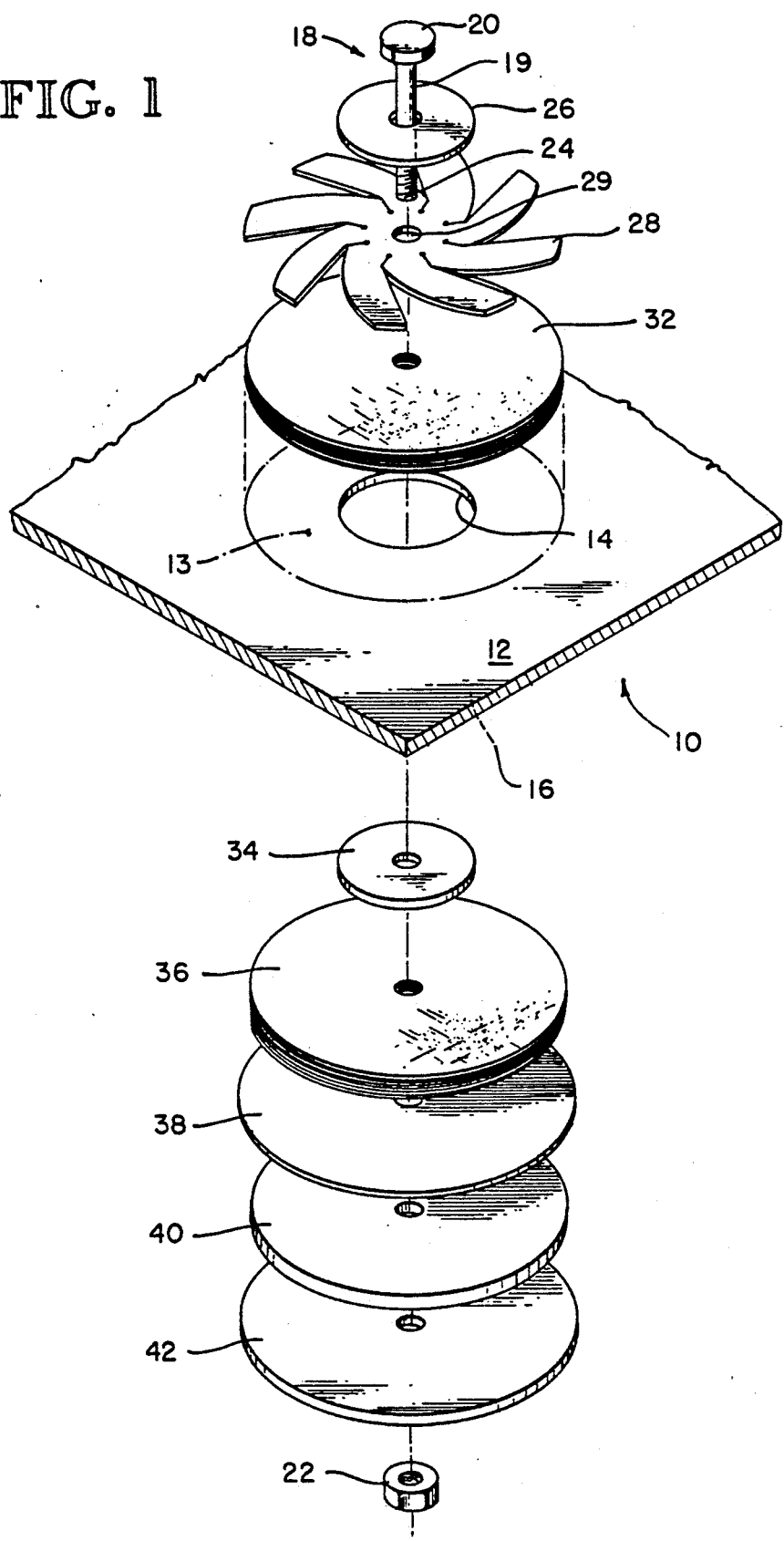
FIG. 1 is an exploded isometric view of a two sided panel patch made in accordance with this invention.

Turning now to the drawings, wherein like or primed reference numerals designate identical or corresponding parts, and more particularly to FIG. 1 thereof, a blind-side patch is shown for repairing a composite material panel 10 having a blind-side 12 to which access is restricted, or is limited to the marginal regions 13 around a circular opening or hole 14 in the panel. The panel also has a near-side 16 which is accessible to the repair personnel. The patch can be applied and used in any orientation, but the description herein will assume that the blind-side is "up" and the relational prepositions such as "above" and "under" will be used with reference to this orientation for description simplicity, but without restrictive effect.

The disclosed patch can be used on virtually any material to which a bonding agent, such as resins or other exotic adhesives, will adhere or can be made to adhere. It is particularly useful for repairing holes in panels of conventional composite material made of layers of oriented fibers or fabric such as fiberglass impregnated with resin and cured to the desired shape, and was specifically designed and extremely effective for repairing holes in panels of modern composite materials including boron, Kevlar and graphite fabric impregnated with any one of a multitude of high strength and/or high temperature resins or bonding agents which can be cured by catalyzed or other reaction curing to form a strong rigid and lightweight structural panel.

The hole 14 in the panel 10 shown in FIG. 1 is formed by a hole cutting saw which removes the damaged section from the panel 10 and creates a circular hole of precise predetermined diameter, for example, 2.0 inches. The inside marginal regions 13 around the blind-side of the hole 14 are cleaned with sandpaper or chemical cleaner or primer. Because of the nature of composite material, any cracks in the material which were formed when the damage was done will not propagate through the material so that the hole cutting saw can remove the entire damaged section. The patch shown can be used to repair other materials such as aluminum, but it is desirable to cut out all of the damaged area including cracks which may have propagated from the damaged area before the patch is applied.

A bolt 18 having an elongated shank 19 and a head 20 is disposed coaxially in the hole 14 and serves to exert a compressive force on the elements of the patch while the patch resin cures. The bolt 18 is presumably made of non-metalic material such as nylon or Kevlar, although stainless steel is also a suitable material where high pressure is desired. Non-metalic material is desirable because it is easy to shear off flush after the patch bonding agent has cured. A nut 22 threaded onto the proximal end 24 of the bolt shank 19 is tightened to exert tensile force on the bolt and thereby create the compressive pressure on the patch elements.

A centrally apertured solid washer 26 is disposed on the bolt 18 in contact with the head 20 on the distal end of the bolt 18. The solid washer 26 is circular in form and is approximately the same diameter as the hole 14, but just slightly smaller in diameter than the hole 14 so that the washer can fit through the hole from the near-side 16 of the panel 12. The bolt shank may be integral with the washer 26 and thereby function as both washer 26 and bolt head 20, to obviate the need for a separate bolt head 20.

Figure 2:
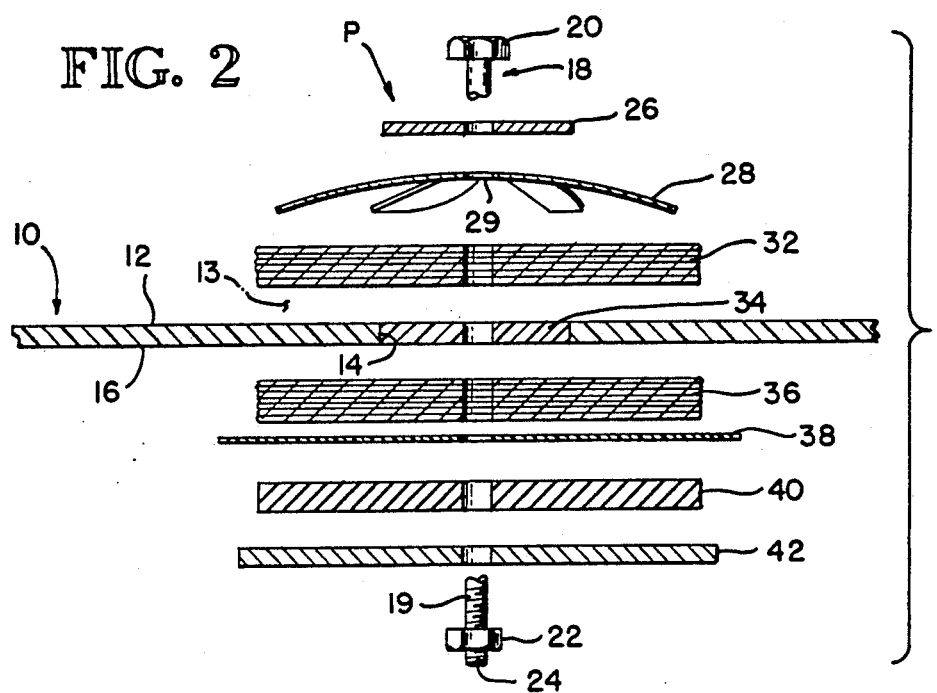
FIG. 2 is an exploded sectional elevation of the patch shown in FIG. 1.
Figure 5:
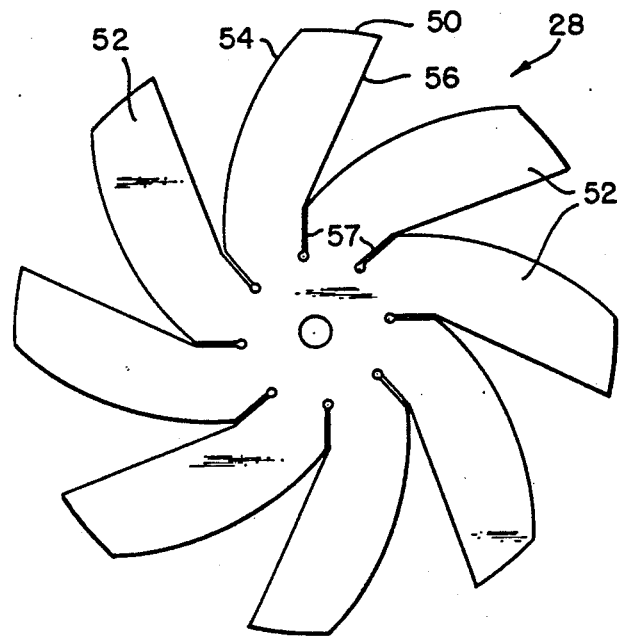
FIG. 5 is plan view of a spiral fluke flexible washer used in the patch assembly of FIG. 1.
Figure 6:
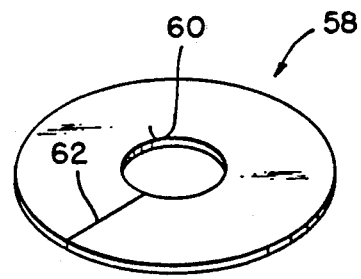
FIG. 6 is a isometric view of a flexible disc washer cut along one radius which can be used in the patchs of FIGS. 1, 3, 9 and 10.
Figure 7:
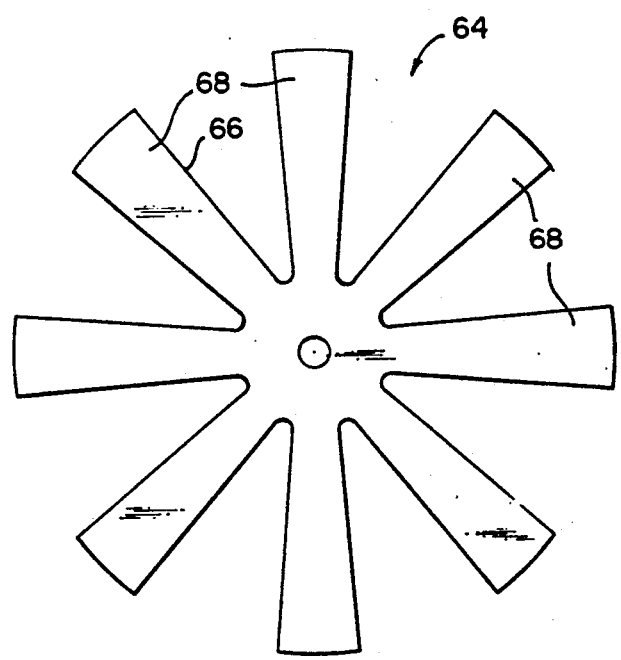
FIG. 7 is a plan view of a radial fluke flexible washer which can be used in the patch of FIGS. 1 and 3.

A flexible washer 28 having a central aperture 29 is disposed on the bolt 18 under the solid washer 26. The diameter of the flexible washer, as shown in FIG. 1 and even more clearly in FIG. 2, is substantially greater than the diameter of the hole 14 so that the washer covers the hole and overlaps the marginal regions 13 around the edge of the hole 14. The flexible washer 28 is made flexible so that it can be pushed through the hole 14 and it will flex as it is pushed through the hole, whereupon it will spring back to its original shape or to a fairly close approximation thereto. Any form or combination of flexible washers may be used in this application, provided that it/they are sufficiently stiff to exert the necessary pressure on the underlying repair material as described below. Some forms of flexible washers which have been specifically designed for this application are shown in FIGS. 5, 6 and 7 but other forms of washers will occur to those skilled in the art. The invention is not limited to the particular forms of washer disclosed herein, except as claimed.

A stack of sheet material laminae, such as filamentous or fabric plies 32, is disposed on the bolt 18 underlying the flexible washer 28. Typically, on double-sided patches shown in FIG. 1 and 2, the stack on each side will contain one more than one half the number of plies in the panel. The fabric plies 32 are coated (e.g. impregnated) with a bonding agent such as liquid resin which is selected for its strength, compatibility with and adhesion to the material of the panel 10 and the fabric plies 32. The liquid resin may be the same as was used in the original construction of the panel. It will typically be a room temperature cureable or heat cureable resin.

Figure 3:
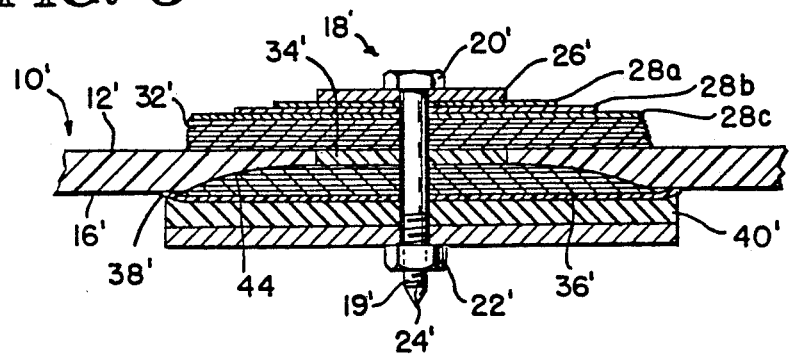
FIG. 3 is a sectional elevation of a modification of the patch shown in FIG. 2.

For maximum strength and load transfer capability across the hole 14, it is preferrable that the fabric plies 32 not be punched with a hole to fit onto the bolt, but rather that the threads merely be pushed aside to allow the bolt to fit through the plies. One simple way of accomplishing this is to use a pointed, tapered instrument which can be pushed into the fabric and will push the fabric threads apart to allow passage onto the bolt 18 without cutting the threads. Another way, illustrated in FIG. 3, is to use a bolt with a proximal end tapering to a point. The point is inserted into the fabric and moved around to push the threads aside, without breaking them, to create a hole wide enough for the passage of the bolt without the threads catching on the bolt threads. The complete uncut threads then provide the optimal load path across the hole through the patch without creating abrupt thread ends within the patch material itself which could tend to act as stress risers.

A plug 34 of fill material is disposed in the hole 14, filling the hole completely. The plug 34 can be a wad of resin soaked fibers which can cure within the hole at the same time that the rest of the patch resin is curing, or it can be a circular plug cut from the same material from which the panel is made, using the same size hole cutter that is used to cut the hole 14. This will insure that the diameter of the plug 34 is the same as the hole 14 (discounting the thickness of the hole cutting saw), and ensures that the thickness of the plug 34 is the same as the thickness of the panel 10. It is typically unnecessary to soak a plug 34 that is cut from a panel which is similar to the panel 10 in resin because there is sufficient excess resin in the fabric plies 32 and 36 that is squeezed into the hole during patch formation so that no additional resin is necessary.

The patch assembly at this point in the repair process has the bolt 18 protruding from a single aperture in the plug 34, and the head 20 of the bolt 18 bearing against the solid washer 26, which in turn bears against the flexible washer 28, which in turns bears against the resin impregnated fabric plies 32 on the blind-side 12 of the panel 10. The solid washer 26, being about the same diameter as the hole 14, is unable to pull through the hole because of the stiffness and shear strength of the flexible washer 28. The flexible washer 28 exerts a substantially uniformed pressure over the entire surface of the fabric plies 32. As shown in FIG. 2, when a flexible washer 28 is pushed through the hole it will often be plastically deformed to a slightly concave configuration as shown which will militate for uniform exertion of pressure over the entire face of the fabric plies 32. However, it is desirable that excessive force not be exerted on the bolt 18 to preclude an upward dishing of the flexible washer 28 which could lessen the pressure exerted on the outer regions of the fabric plies 32 and thereby weaken the bond at that point.

A second set of resin impregnated fabric plies 36, identical to the first set 32, is slid onto the proximal end of the bolt 18 protruding through the hole in the plug 34. A release agent or film 38 and a disc 40 of compliant material such as rubber is slid onto the bolt. The release film 38 is selected to prevent adhesion of the disc 40 to the patch material for easy removal of the disc 40 after the resin has cured. The disc 40 is covered with a solid steel support plate 42, and the nut 22 is screwed onto the end of the bolt 18 and tightened to exert the required compressive force on the washer 26 and plate 42 and hence on the plies 32 and 36. The compressive pressure on the plies 32 and 36 uniformly distributes the resin throughout the fabric and squeezes excess resin out of the material. More importantly, the pressure expresses the voids from the fabric plies. Such voids could tend to form stress risers and points of weakness within the patch. As mentioned earlier, the compressive force also squeezes the excess resin into the hole 14, filing the crack between the plug 34 and the sides of the hole 14 and providing a continuous body of material throughout the patch. The rubber disc 40 is squeezed by the support plate 42 against the fabric plies 36 (through the release film 38) and tends to smooth the patch material and form a smoothly tapered surface profile on the near-side 16 of the panel 10.

After the resin in the patch material has cured, the nut 22 is unscrewed from the proximal end 24 of the bolt 18, and the support plate 42, the rubber disc 40, and the release film 38 are slid off the bolt. The bolt is then cut off flush with the surface of the patch and, if desired, the patch may be buffed and finish coated to match the coating on the near-side 16 of the panel 10. The fabric plies 32 and 36 in the completed patch provide a strong load path across the hole 14 in both compressive and tensile stresses so that the bending moments exerted on the panel in either direction are borne with virtually the same load carrying capacity as the original panel.

To improve the adhesion of the patch material to the panel surfaces, it is sometimes desirable to provide yieldable plies immediately adjacent the surfaces of the panel. This allows the inner layers of the plies 32 and 36 to yield under high stress and transfer the load to the overlying plies rather than delaminate from the panel surfaces. This can be achieved by using lesser strength materials on the inside surfaces of the patch. One example is to use one or two plies of glass fabric adjacent the surfaces 12 and 16 of the panel 10 and two to five plies (depending on the panel thickness) of graphite fabric over the glass fabric plies. This enables the glass fabric plies to yield and transfer the stress to the graphite fabric rather than peel away from the surface of the panel 10. The load carrying capacity in the patch is thereby increased.

When it is desired to retain exactly the original mold line configuration of the panel, the near-side of the panel in the marginal regions around the hole 14 may be scarfed to provide a tapered recess into which the near-side plies can lie within the original mold lines of the panel. A patch of this configuration is shown in FIG. 3 showing a scarf 44 cut into the near-side surface 16' of the panel 10'. The use of a scarf 44 in the surface of the panel 10' makes it desirable to use a stack of repair plies 36' which are of slightly increasing diameter moving toward the proximal end 24' of the bolt 18'. The, scarf can be cut with a simple convex grinder or sanding disc with an edge depth gauge.

The patch shown in FIG. 3 also includes a plurality of flexible washers 28a, 28b and 28c. This allows a more uniform transfer of pressure from the bolt head 20' through the solid washer 26', through the flexible washers 28 a-c to the radially outer regions of the fabric plies 32' without recourse to a flexible washer of excessive stiffness.

Figure 4:
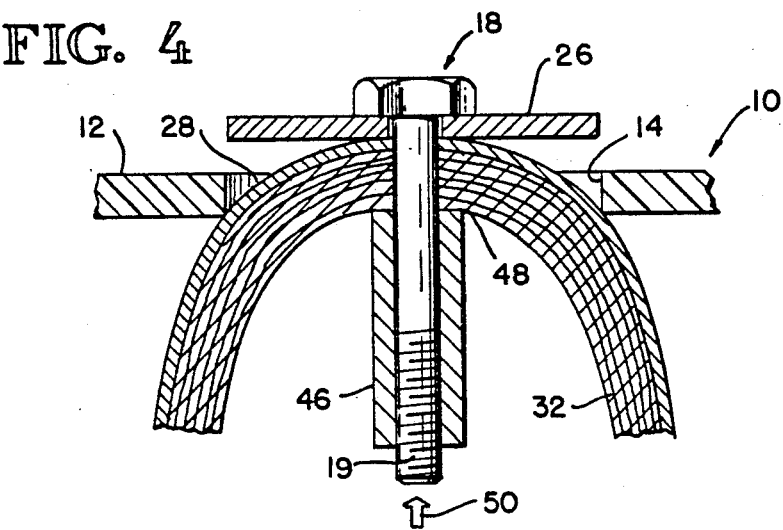
FIG. 4 is a sectional elevation of the blind-side portions of the patch shown in FIG. 1 being installed.

The method of installation of the patch shown in FIGS. 1 and 2 through the hole 14 in the panel 10 is shown in FIG. 4. The blind-side elements of the patch, namely the solid washer 26, the flexible washer 28 and the resin impregnated blind-side fabric plies 32 are inserted onto the bolt 18, and a tool 46 is then inserted onto the bolt 18 with its distal end 48 abutting against the inner regions of the plies 32 around the bolt 18. The tool 46 is nothing more than a piece of pipe having an interior bore which closely fits around the bolt shank 19. Its purpose is to exert a pushing force on the inner regions of the fabric plies 32 and the flexible washer 28 to force the washer to bend, as shown in FIG. 4, and pass through the hole 14, and hold the bolt from being shot into the cavity behind the blind-side 12 of the panel 10 when the flexible washer 28 springs back from its flexed shape shown. After the blind-side elements of the patch are pushed through the hole 14, the tool 46 is removed for installation of the other patch elements.

Several flexible washers are shown in FIGS. 5, 6 and 7. The washer 28 shown in FIG. 5 has a circular outer periphery 50 and includes a plurality of eight flukes 52, each having a curved edge 54 and a straight edge 56. At the junction of the straight edge 56 and the curved edge 54 of the adjacent fluke 52, the flexible disc 28 is cut on a radial line 57 a distance sufficient to give the fluke 52 the required flexibility to pass through the hole 14 without excessive plastic deformation. The spiral shape of the fluke 52 produces an off-set force on the fluke as it is pushed into the hole 14 which gives it a slight twist as it bends, so that it presents its curved edge to the edge of the hole 14 to minimize the frictional resistance of the flexible washer as it passes through the hole.

Figure 10:
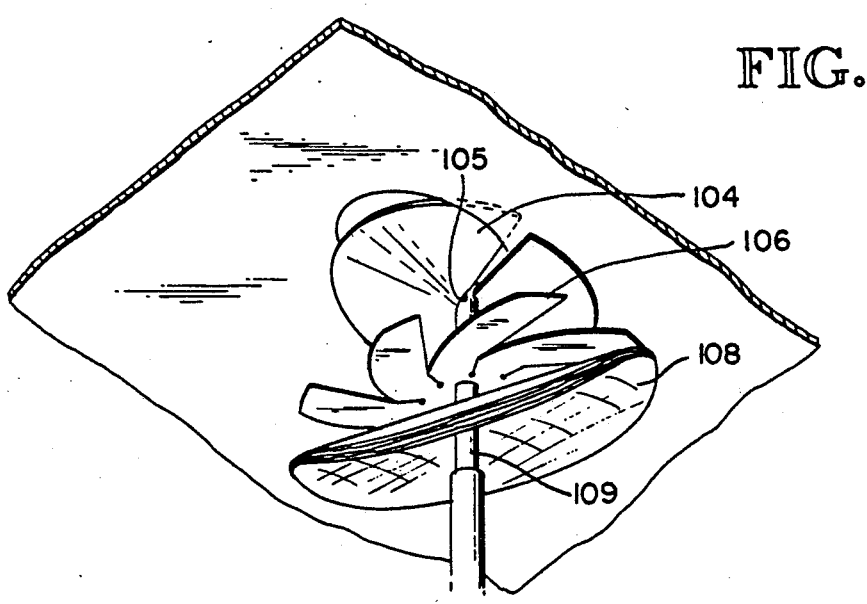
FIG. 10 is an isometric view of the flexible disc of FIG. 6 being threaded into a hole in the panel of FIG. 9.

Another form of flexible washer is the flexible disc 58, shown in FIG. 6, in the form of a flat or slightly domed washer having a central hole 60, and a cut or slit 62 running from the hole 60 out to the circumferential edge of the flexible washer 58 along one radius. The slit 62 enables the flexible washer 58 to be twisted slightly so that one edge can be threaded into the hole 14 as illustrated in FIG. 10, and then the entire washer 58 can be rotated into the hole even though the washer is of a greater diameter than the hole 14. Disc 58 distributes the compressive force exerted by the bolt head 20 over the radially outer portions of the fabric plies 32 as uniformly as possible when the nut 22 is tightened. The disc 58 may be made perfectly flat if it has sufficient stiffness to resist dishing up at its outer edges when tightened to exert the required pressure against the blind-side plies.

Yet a third form of flexible washer is shown in FIG. 7. This washer uses a flat disc 64 having rounded wedge shaped cutouts 66 evenly spaced around the disc to form between them a series of eight radially extending flukes 68 which are wider at their radial extremities than they are at their inner regions. To increase the stiffness at the inner regions of the flukes 68, so that the pressure is sufficient and uniform over the entire patch, the disc 64 can e made thicker at its center, tapering to thinner at its radial outer edges.

The flexible washers shown in FIGS. 5, 6 and 7 may be used together in the manner shown in FIG. 3. For example the washer of FIG. 6 can serve as the top washer 28a, the washer shown in FIG. 7 can be the second washer 28b or bottom washer 28c, and the washer shown in FIG. 7 can be the bottom washer 28c, or the second washer 28b. Other combinations and other washer configurations will occur to those skilled in the art in view of this disclosure.

Figure 8:
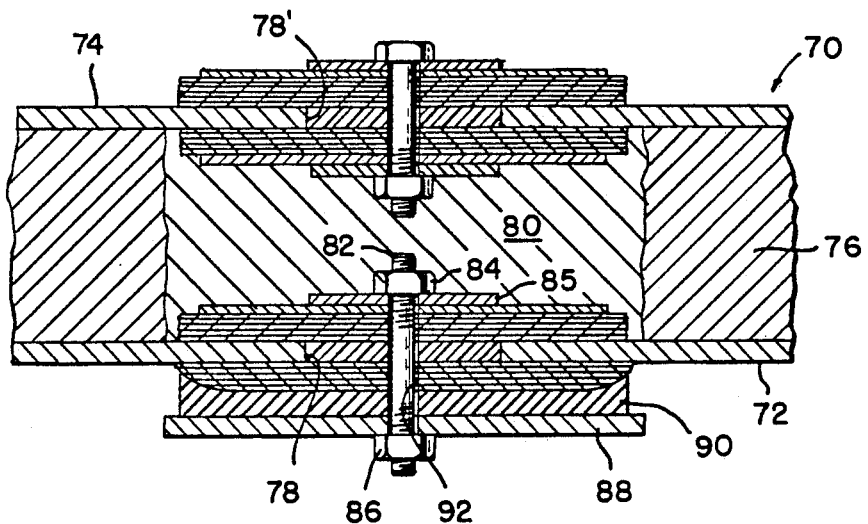
FIG. 8 is a sectional elevation of a patch being used to repair a thick honeycomb core panel in accordance with the method of this invention.

Some composite material panels utilize an inner and outer skin of composite material and a honeycomb core between them. The repair of this type of panel has been particularly difficult in the prior art, but the use of this invention makes a quick and extremely strong repair of these panels. The process and structure of such a repair is illustrated in FIG. 8 in which the honeycomb panel 70 includes a near-side skin 72 and a blind-side skin 74, sandwiching between them a thick core 76 of honeycomb or syntactic foam. To accomplish the repair, a hole 78 is drilled in the near-side skin 72 with a hole saw similar to that used to drill the hole 14 in the panel 10, and the hole is continued straight through the panel to form a hole 78' of the same diameter in the blind-side skin 74. The honeycomb material in the region of the damage is removed to provide a cavity 80 to accommodate the repair materials. The blind-side skin 74 is then repaired in the same manner as that shown for the repair of the panel 10 in FIGS. 1 and 2, although the compliant disc 40 is not necessary since the lower surface of the patch on the blind-side skin 74 is in the interior of the panel 70.

Without waiting for the resin in the blind-side panel patch to cure, the near-side skin 72 is also repaired in the same manner as that disclosed for the panel 10 in FIGS. 1 and 2, with the difference that, instead of using a bolt 18 with a head 20, a threaded rod 82 with a nut 84 on its distal end is used. The nut 84 could be fastened to the solid washer, or integral with it, so that it would not turn when the nut 86 is tightened against the support plate 88. A release material is coated on the threaded rod 82 so that the bonding agent in the patch material will not stick to the rod 82.

After the bonding agent in the patch material for the near-side skin repair patch has cured, the nut 86, support plate 88 and rubber disc 90 are removed. The threaded rod 82 is unscrewed from the nut 84, leaving a axial hole 92 through the center of the patch in the near-side skin 72. The hole 92 provides a convenient access for injecting a syntactic foam into the cavity 80 which cures in place to rigidify the panel in the region of the patch, in the same manner as the original honeycomb provided.

Figure 9:
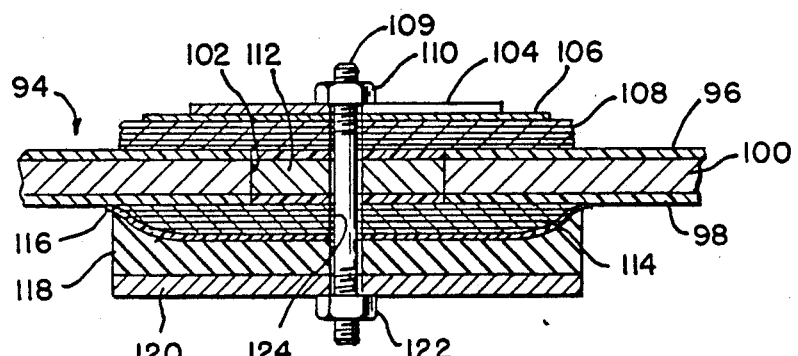
FIG. 9 is a sectional elevation of a thin honeycomb core panel repaired with a patch in accordance with this invention.

Some honeycomb panels are too thin to accommodate patch elements in their core. Such a panel 94, illustrated in FIG. 9, includes a blind-side skin 96 and a parallel, spaced near-side skin 98, sandwiching a honeycomb or syntactic foam core 100. A hole 102 is drilled with a conventional hole saw through both skins and the core of the panel. A cut or slit, flat, circular turn-in disc 104 having a center bolt hole and a straight radial slot from circumference to bolt hole, a flexible washer 106, and a stack of blind-side resin impregnated fabric plies 108 are slid onto a threaded rod 109 having a nut 110 on its distal end and coated with a release material like that used on the rod 82 in FIG. 8. The assembly is inserted through the hole 102 in the same manner as that illustrated in FIG. 4. The slit turn-in disc 104 and flexible washer 106 may also be used in the patch of FIGS. 1 and 2. Alternatively, a stack of slit discs 104 may be used, with their slits misaligned angularly and with a bonding agent applied between them when inserted through the hole 102 to the blind-side of the panel. The number of discs 104 may be adjusted to attain whatever stiffness is desired. The number of fabric plies 108 in the stack may be as few as one, but preferrably is equal to one more than is in the blind side skin. A thin panel will typically have two or three ply skins, so each stack of repair plies for repair of such a panel will have three or four plies.

The diameter of the disc 104 can be as large as twice the diameter of the hole 102 in the panel, less the diameter of the threaded rod 109. However, for ease of insertion the disc 104 is made slightly smaller. Specifically, it has been found that the disc is very easily inserted if its diameter is made equal to twice the diameter of the hole 102 in the panel, less twice the diameter of the rod 109. It is desirable to raise the rod 109 sufficiently that the bolt head or nut 110 is clear of the panel, that is, it overlies the blind-side of the panel, so the disc can be revolved into the hole 102 using the rod 109 as a handle.

A core plug 112, preferably cut from a similar panel with the same size hole cutting saw that cut the hole 102, is fitted over the rod 109 and into the hole 102. A stack of repair plies 114 is slid onto the bolt and is covered by a release film 116. A compliant disc 118 covered by a rigid support plate 120 slides onto the bolt is secured by a nut 122. The nut 122 is torqued up tight against the support plate to produce sufficient pressure on the repair plies 108 and 114 to squeeze the excess resin out of the plies and into the core plug 102, and to express all voids out of the plies 108 and 114.

After the resin has cured, the removable rod 109 may be unscrewed from the threaded hole 124 created by the resin curing around the rod 124. The hole 124 provides an inspection port for insertion of the probe of a fiber optic inspection instrument. This allows inspection of the interior structure behind the panel without weakening the panel. The hole 109 can then be replugged and sealed with non-permanent sealant on the same threaded rod 109 by providing a screw driver slot in its proximal end and screwing it in flush with the outer surface of the patch. The patches of FIG. 1 and 3 may also be made using a removable rod by replacing the headed bolts 18 and 18' with similar threaded rods 109 and nuts 110.

The slit disc turn-in disc 104 may be used without the fabric plies to provide a hermetically sealed back-up plate on the blind-side of a panel for panel repairs that do not require restoration of substantial strength, or for panels that are not load bearing. The repair is accomplished by inserting the disc 104, on its rod 109 and nut 110 with or without a back-up washer 26, through the panel hole 102, and applying a bonding agent such as resin to adhere the disc 104 to the marginal regions around the hole 102 on the panel blind-side, and also to seal the radial slit in the disc. The rod 109 is held in place with a nut 122 against a support plate 120 or suitable spider while the resin cures. Likewise, the flexible washers of FIGS. 5 and 7 with back-up washers 26 may be used in the same manner for the same purpose.

Obviously numerous modifications and variations of the patch structure and method disclosed above are possible and will occur to those skilled in the art in view of this disclosure.

Therefore it is expressly to be understood that these modifications and variations, and the equivalents thereof, may be practiced while remaining within the spirit and scope of this invention as defined in the following claims, wherein I claim:

1. A blind-side repair patch for repair of both the blind-side and the near-side of a holed composite material panel, comprising:
   a fastener extending completely through said panel hole;
   a plug of core material containing a bonding agent filling said hole completely;
   a plurality of fabric plies impregnated with a bonding agent on both sides of said panel, said plies being substantially larger in diameter than said hole, and covering said hole, said plug, and the marginal regions of said panel around said hole completely;
   a flexible washer larger in diameter than said hole, and having been pushed through said hole, flexing as it passes through the hole and then springing back to approximately its original shape after passing through the hole, said flexible washer disposed against said blind-side plies and pressing thereagainst to press said plies against said marginal regions of said panel around said hole and against said core plug;
   a solid washer having a diameter slightly smaller than said hole and urged by said fastener against said flexible washer to press said flexible washer against said blind-side plies and thereby express voids out of said blind-side plies and force liquid bonding agent around said plug;
   a support plate having a diameter at least as large as the diameter of said near-side plies, said support plate disposed against and pressing said near-side plies against said marginal regions of said panel around said hole and against said core plug, thereby expressing voids out of said near-side plies and forcing liquid resin around said plug; and
   means for creating tensile stress in said fasteners and for exerting compressive force on said support plate and on said flexible washer.

2. The patch defined in claim 1, further comprising a sheet of compliant material between said support plate and said near-side plies to smooth and taper the surface of said patch on the near-side.

3. The patch defined in claim 2, further comprising a release agent between said compliant sheet and said near-side plies to facilitate removal of said support plate and said compliant sheet after the patch bonding agent has cured.

4. The patch defined in claim 1, wherein said hole is circular and said flexible washer and said plies are circular.

5. The patch defined in claim 1, wherein said nut and support plate are removed after said bonding agent has cured and said bolt is cut off flush with the near-side outer surface of said near-side plies.

6. The patch defined in claim 1, wherein said plug of core material is a cylindrical plug cut from a panel of the same material as said panel.

7. The patch defined in claim 1, further comprising a plurality of flexible washers in a stack of increasing diameter from said solid washer toward said blind-side plies.

8. The patch defined in claim 1, wherein said plies closest to said panel are less stiff than the plies more remote from said panel to militate against delamination under stress.

9. The patch defined in claim 1 wherein said flexible washer has a centrally apertured hub from which radiate a plurality of flexible flukes which flex when said flexible washer is pushed through said hole to allow passage through said hole, and then spring back to approximately their original shape.

10. The patch defined in claim 9, wherein said flexible flukes are each spiral in form and twist to present one curved edge to said hole sides when pushed into said hole to minimize the frictional sliding force resisting passage through said hole.

* * * * *